Feb. 23, 1965

G. USTIN ETAL 3,170,501

CRIMPING TOOL

Filed March 20, 1961

INVENTORS
GEORGE USTIN
LOUIS NETTA

BY

ATTORNEY

Feb. 23, 1965 G. USTIN ETAL 3,170,501
CRIMPING TOOL

Filed March 20, 1961 10 Sheets-Sheet 7

INVENTORS
GEORGE USTIN
LOUIS NETTA
BY
ATTORNEY

Feb. 23, 1965  G. USTIN ETAL  3,170,501
CRIMPING TOOL

Filed March 20, 1961  10 Sheets-Sheet 10

INVENTORS
GEORGE USTIN
LOUIS NETTA
BY
ATTORNEY

United States Patent Office 3,170,501
Patented Feb. 23, 1965

3,170,501
CRIMPING TOOL
George Ustin, Verona, and Louis Netta, Elizabeth, N.J., assignors to Buchanan Electrical Products Corporation, Hillside, N.J., a corporation of New Jersey
Filed Mar. 20, 1961, Ser. No. 96,938
11 Claims. (Cl. 153—1)

This invention relates to crimping tools and particularly to an improved construction and method of operation for portable cartridge supplied semi-automatic crimping tools for effecting the controlled deformation of separable pin and socket contact members used in electrical connectors.

Crimping tools incorporating a bored dieholder having a plurality of radially displaceable crimping dies or indenters mounted therein and an associated rotatably displaceable operating member for effecting crimping die displacement are well known and widely utilized in the art. Utilization of such tools, however, conventionally requires manual workpiece preassembly, from bulk component element supplies, by insertion of an insulation stripped wire end into the wire receiving portion of a preformed proprietary design electrical contact member, such as a terminal pin or socket contact member, and manual insertion of such preformed workpiece into the workpiece receiving bore of the dieholder prior to initiation of crimping die advance to effect the desired deformation thereof. Such multiplicity of required manual handling operations has, in addition to the attendant hazard of workpiece contamination, effectively limited the production efficiency of the subject tools and has materially contributed to the fabrication costs of such deformed electrical connectors.

This invention may be briefly described as an improved construction for semi-automatic crimping tools adapted to accommodate a predetermined size range of varying proprietary design electrical contact members and to markedly reduce the number of required manipulative operations performed by the tool operator in the fabrication of deformed electrical connectors. The subject invention includes, in its broad aspects, utilization of an elongate flexible carrier strip having predetermined pluralities of electrical contact elements selectively mounted thereon, and a method of operation wherein carrier strip mounted electrical contact members are cyclically removed from a disposable preformed cartridge type supply thereof and lineally introduced thereof, through an integral channeled dieholder, into a predetermined operating location in the path of crimping die advance where workpiece formation is effected by the guided introduction of an insulation stripped wire end into the selectively positioned wire receiving portion thereof and where the desired deformation of the workpiece, as so formed, is subsequently effected; an effectively tamper proof crimp depth control mechanism automatically and selectively settable by releasable securement of said preformed supply cartridge to the tool in accordance with the size and character of carrier strip mounted contact members disposed therein; a full cycling control means to assure completion of operations on a given workpiece prior to initiation of operations on subsequent workpiece and an improved constructional arrangement between the primary power source and the crimping assembly which permits an appreciable reduction in the overall size of power operated crimping tools. The invention also broadly includes the provision of a novel disposable preformed supply package or cartridge containing predetermined pluralities of selectively positioned carrier strip mounted electrical contact elements that is readily securable to the crimping tool and additionally surves as a contaminant free storage package that is readily coded or otherwise delineated, to provide clear visual identification of the number and character of the contact members contained therein for both inventory control and selective fabrication procedures. Also included in the invention is a novel and improved contact member indexing and feed unit responsive to the presence of a workpiece in the operating location and which utilizes operating member displacement as a power medium.

Among the advantages of the herein disclosed invention is the permitted reduction in the number of required manipulative procedures in the fabrication of deformed electrical connectors with a concomitant permitted increase in production rates and decrease in fabrication costs; the permitted utilization of carrier strip mounted electrical contact members and the automatic disposition thereof at an operating location where workpiece formation is effected by mere introduction of an insulation stripped wire end into the wire receiving portions thereof and the permitted utilization of a disposable, preformed cartridge type supplies of predetermined pluralities of contaminant free, carrier strip mounted electrical contact elements that is releasably securable to the subject tool and which can be readily coded or otherwise delineated to provide for ready identification of the number and character of the contact members contained therein for inventory control and selective fabrication procedures and thereby avoid utilization of bulk supplies of component elements. Another advantage of the subject invention is the provision of an effectively tamper proof crimp depth control that is automatically settable by cartridge securement in accordance with the selective dictates of the contact members contained therein and an associated self-contained full cycling control system to assure completion of operations upon a given workpiece prior to initiation of operations upon a subsequent workpiece. A further advantage of the instant invention is the provision of an improved construction for crimping tools that can accommodate, without operator adjustment, a predetermined size range of varying proprietary design contact members. A still further advantage of the instant invention is the provision of a reduced sized lightweight, easily handable, tool of durable character that can be inexpensively fabricated and readily converted to a bench mounted unit adapted to utilize effectively endless contact member carrier strips if the exigencies of production so require.

The object of this invention is the provision of an improved construction for portable semi-automatic crimping tools for effecting the controlled deformation of separable pin and socket contact members used in electrical connectors.

Other objects and advantages of the instant invention will become apparent to those skilled in this art from the following specification and claims and from an examination of the appended drawings which illustrate a presently contemplated preferred embodiment of a semi-automatic portable crimping tool constructed in accordance with and embodying the principles of this invention.

Referring to the drawings:

FIGURE 1 is an oblique view of a crimping tool construction cited in accordance with the principles of this invention.

FIGURE 2a is a schematic side elevational view of an electrical contact element and a preferred form of a carrier strip for electrical contact elements utilizable in the subject tool.

FIGURE 2b is a section on the line 2b—2b of FIGURE 2a.

FIGURE 2c is a section on the line 2c—2c of FIGURE 2a.

For the purpose of convenience and clarity, the subject tool, which constitutes a presently contemplated preferred embodiment incorporating the principles of the invention, may be considered as being made up of a plurality of structurally and operationally interrelated major assemblies, including a housing assembly; a crimping or workpiece deformation assembly defining an operating location; a pneumatically powered drive and control assembly; a carrier strip assembly for releasably supporting pluralities of electrical contact members in predetermined positional relationship; a contact member indexing and feeding assembly; and preformed cartridge supply means containing said strip mounted electrical contact members.

*Housing assembly*

Figures 1, 2A, 2B, 2C:
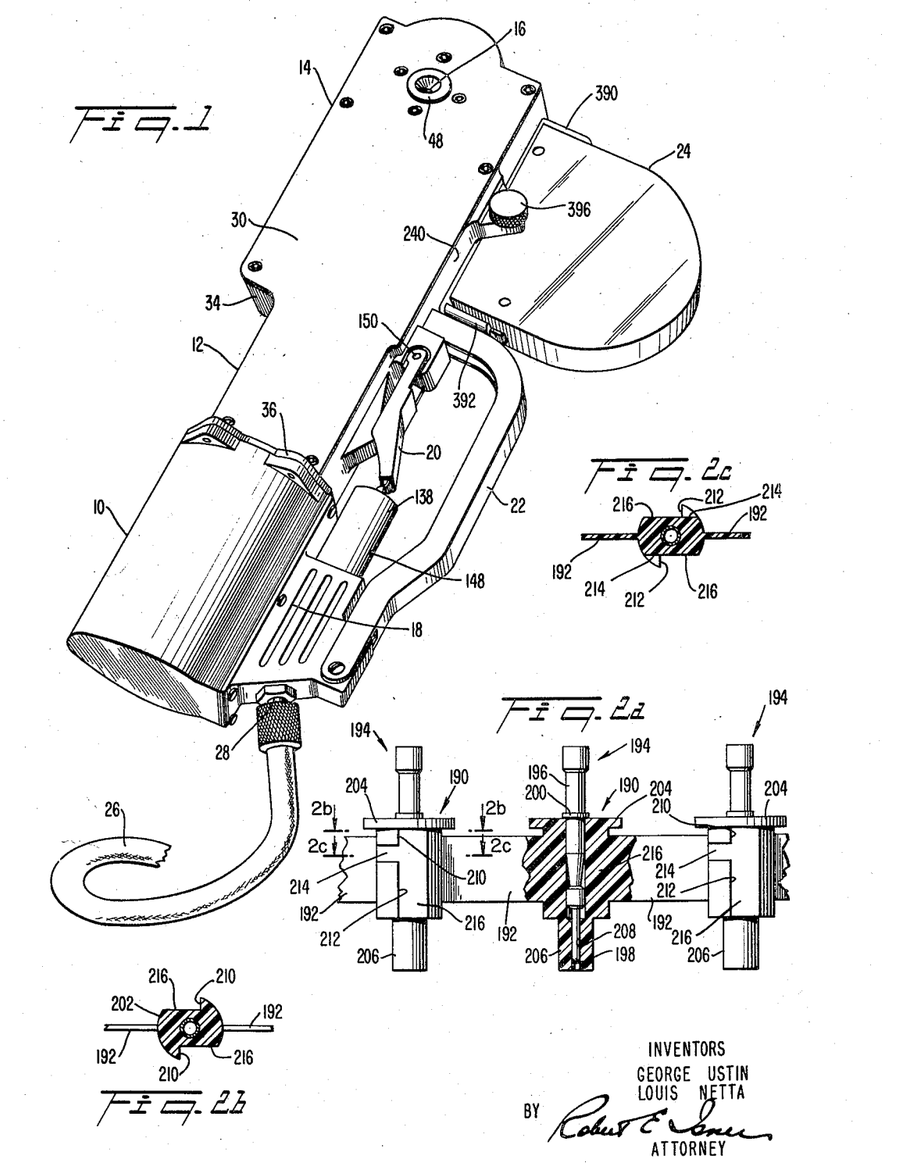
Figures 8, 13:
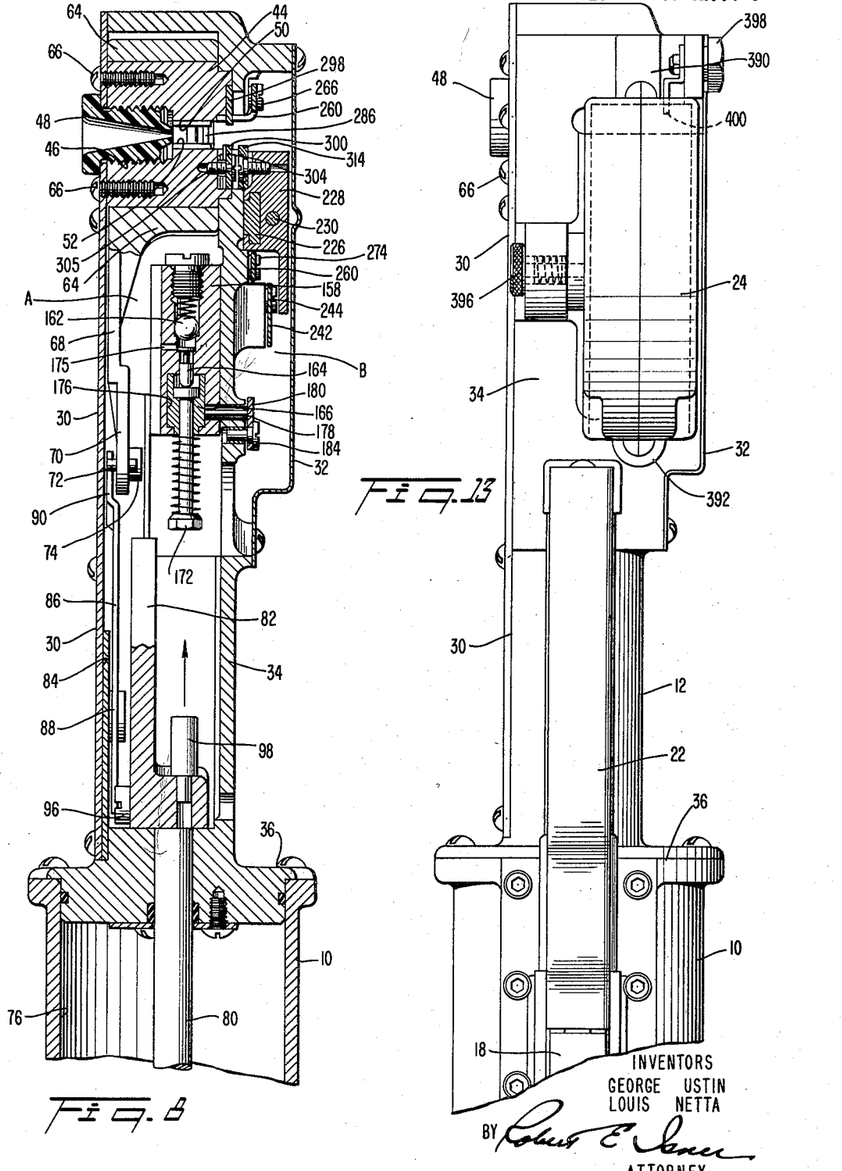
FIGURE 8 is a section taken on the line 8—8 of FIGURE 6.
FIGURE 13 is an end view of the subject tool.
Figure 9:
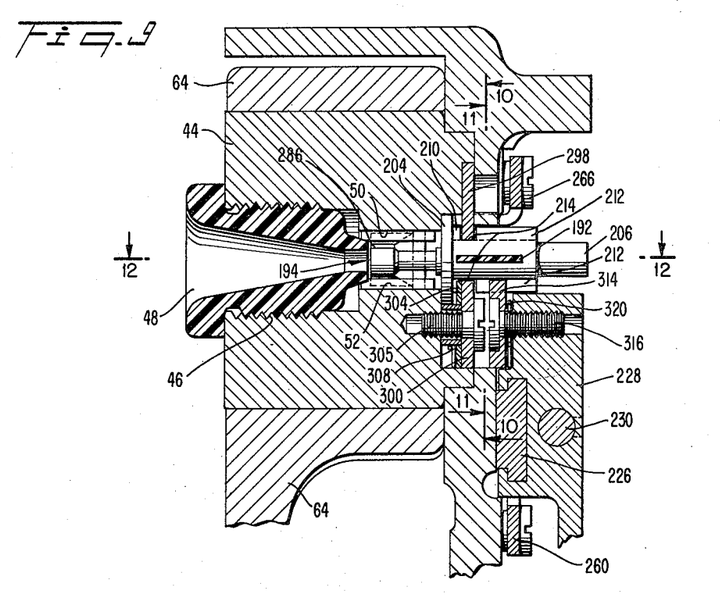
FIGURE 9 is an enlarged view of the carrier strip index and feed components illustrated in FIGURE 8.

As best shown in FIGURE 1, the subject tool preferably includes a generally cylindrically shaped basal barrel portion 10 housing a double acting pneumatic power cylinder and an adjacent extending body portion shaped to provide an intermediate rectangularly shaped holding portion 12 of reduced size and an integral enlarged rectangularly shaped terminal portion 14 having a wire entry aperture 16 on the upper planar facing surfaces thereof. Positioned adjacent to the barrel portion 10 is a control valve assembly, generally designated 18, actuatable by a pivotally mounted and spring biased trigger member 20 positioned adjacent the intermediate body portion 12 and disposed within a trigger guard member 22. As illustrated, the terminal body portion 14 is adapted to releasably receive a preformed cartridge 24 containing, as will be described in detail hereinafter, a predetermined plurality of electrical contact members releasably mounted on an elongate flexible carrier strip. Pneumatic operating power is supplied by means of a high pressure air hose 26 connected to a suitable entry port 28 in the control valve assembly 18. Referring now also to FIGURE 8, the intermediate and terminal body portions 12 and 14 are preferably formed by the mounting of upper and lower planar cover plates 30 and 32 on a cast frame member 34. The cast frame member 34, which is suitably shaped and contoured to provide the necessary supporting fixtures for the internally disposed component elements of the various operating assemblies, essentially divides the subject tool into two main operating areas, conveniently designated A and B on FIGURE 8. In general, area A which is disposed intermediate the frame 34 and the upper cover 30 houses the crimping assembly and the crimping assembly drive and control mechanism. In contradistinction therewith, area B, which is disposed intermediate the frame member 34 and the lower cover member 32, houses the contact member indexing and preassembly as well as a portion of the crimp depth control mechanism and cartridge securement fixtures.

*Crimping assembly*

As best shown in FIGURES 3, 4, 8 and 13, 14 and 15, there is provided a unitary cylindrically shaped dieholder 44 having an enlarged axially disposed wire entry aperture 46 (FIGURE 8) sized to threadly receive a conically bored wire guide means 48, suitably in the nature of a grommet member having an expandable terminus, therewithin. The enlarged entry aperture 46 inwardly terminates in an axially disposed coaligned bore 50 of reduced diameter that defines an operating location at which workpiece formation and deformation is effected. The undersurface of the dieholder 44 is provided with a diametrically disposed and generally rectangularly shaped electrical contact element transmission channel 52 (FIGURE 14) that intersects said bore 50 to permit lineally displaceable introduction of the extending wire receiving portions of the carrier strip mounted electrical contact members into the operating location defined thereby and into axial coalignment with the wire guiding bore of wire guide means 48 in proper positional relationship relative to the path of advance of the hereinafter described crimping dies. The dieholder 44 is additionally provided with a plurality (suitably four in the illustrated embodiment) of radially disposed crimping die member receiving bores 54 inwardly terminating at the axial bore 50 defining said operating location. Reciprocably mounted within each of said radial bores 54 is a crimping die or indentor member 56 having an exposed cam surfaced head portion 58. The crimping dies 56 are normally biased outwardly of said bore 50 by individual interposed biasing springs 60 into sliding abutting engagement with suitably shaped cam surfaces 62 disposed on the inner periphery of an annularly shaped and rotatably displaceable operating member 64 disposed in surrounding and closely abutting relation with the periphery of said dieholder 44. The dieholder 44 is secured against rotation and is fixed in position by a plurality of bolts 66 which pass through the planar cover member 30.

In the above described crimping die assembly, which is essentially conventional in nature save for the provision of the diametrically disposed contact element transmission channel 52, a rotative displacement of the operating member 64 in the counterclockwise direction (as viewed in FIGURES 3, 4, 14 and 15) relative to the fixed dieholder 44 results in a simultaneous cam actuated converging displacement of the crimping die members 56 into the bore 50 with the concomitant deformation of a workpiece positioned therein. Conversely, a clockwise rotational displacement thereof relative to said fixed dieholder 44, as effected by expansion of said compressed biasing springs 60, results in a permitted simultaneous radial diverging displacement of said crimping die members 56 out of said bore 50. The action of said biasing springs 60 thus serves to normally bias said operating members 64 in the clockwise direction (as viewed in the above identified figures of the drawings) and as such to normally maintain said crimping dies 56 in retracted position and out of the bore 50.

The rotatably displaceable and annularly shaped operating member 64 is provided with an integral extending actuating arm 68 having the terminal portion 70 thereof disposed in abutting parallel spaced relation with the underside of the cover plate 30. Mounted on the upper surface of said terminal portion 70 of said actuating arm 68 and disposed in the space intermediate said cover plate 30 and the upper surface of said terminal portion 70 is an extending drive pin 72. Disposed on the underside of the actuating arm terminal portion 70 is a dependent drive boss 74.

*Crimping assembly drive and control mechanism*

As best shown in FIGURES 3, 4, 8, 14 and 15, the basal barrel portion 10 of the above described housing assembly defines a pneumatically operable double acting power cylinder 76 conventionally including a longitudinally displaceable piston, generally designated 78, and extending piston rod 80 secured thereto and disposed in substantial longitudinal alignment with the dieholder 44. Mounted on the exposed end of the piston rod 80 is an extending and generally triangularly shaped drive wedge 82 having its inclined operating surface positioned to engage, upon longitudinal advance thereof, the dependent drive boss 74 on the underside of the terminal portion 70 of the operating member actuating arm 68, when said boss has been preliminary positioned in the path of advance thereof. Disposed adjacent to the underside of the cover plate 30 is a slotted plate 84 (FIGURE 3) having an elongate link cam member 86 pivotally mounted thereon as at 88. The link cam member 86 is provided with a terminal portion 90 disposed in abutting driving engagement with the drive pin 72 mounted on the upper surface of the terminal portion 70 of the operating member actuating arm 68. The other terminal end 92 of said link cam member 86 is provided with an inclined operating surface 94 positioned to be slideably engaged and rotatably displaced by an extending drive pin 96 mounted on and longitudinally displaceable in conjunction with the drive wedge 82. Disposed beneath the drive wedge 82 (FIGURES 8 and 15) and longitudinally displaceable in conjunction therewith is an extending stud 98 forming a portion of the crimp depth control assembly as will be hereinafter described in detail.

Figure 3:
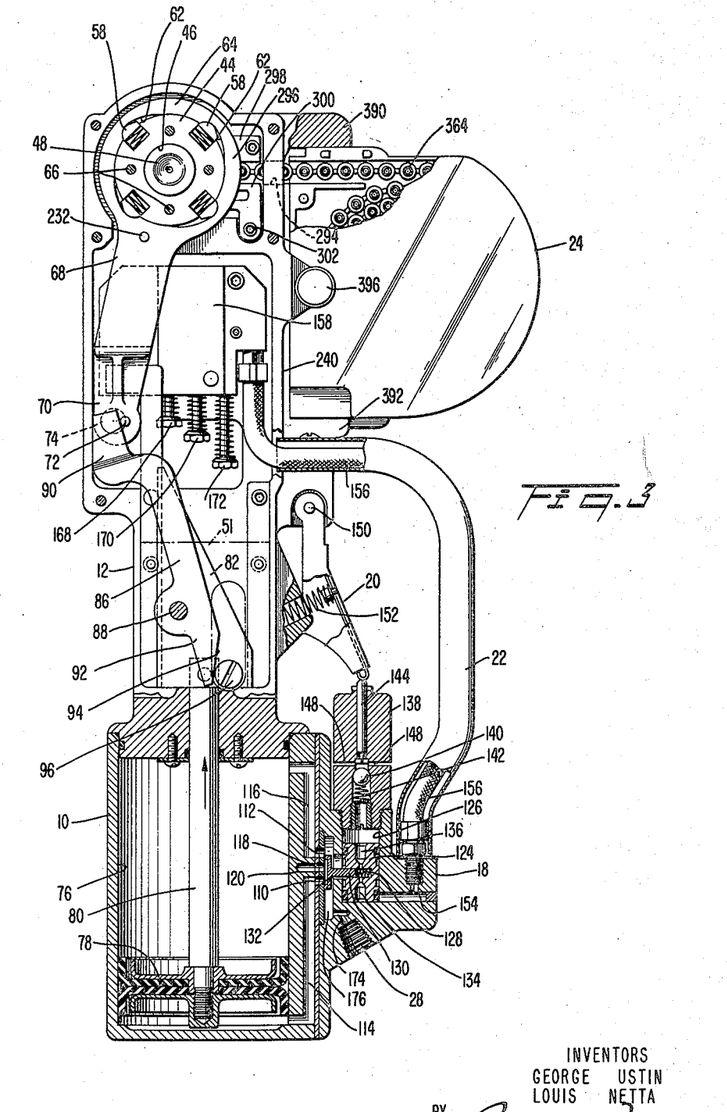
FIGURE 3 is a plan view, partly in section, of the tool illustrated in FIGURE 1.
Figure 4:
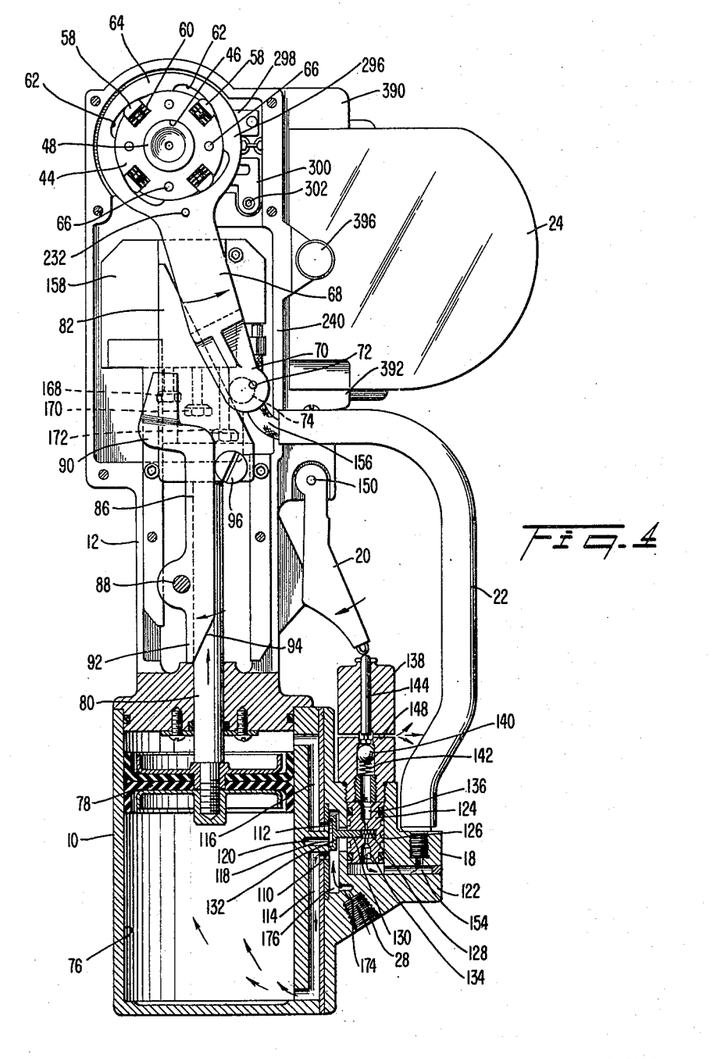
FIGURE 4 is a plan view similar to the showing of FIGURE 3 but showing the disposition of the illustrated component elements at a different point in the operational cycle.

As will be apparent from the above, an advance of the piston rod 80 from the retracted position illustrated in FIGURE 3 results in a concomitant advance of the drive wedge 82 and drive pin 96 mounted thereon. The initial advance of the drive wedge 82 effects, through engagement of said drive pin 96 with the inclined operating surface 94 of the link cam member 86, a limited clockwise rotative displacement of said link cam member 86 about its pivotal mounting 88. Such limited rotative displacement of the cam link member 90 effected a limited concomitant counter-clockwise displacement of the operating member 64 relative to the dieholder 44 and consequent limited advance of the crimping die members 56 through the driving engagement of the terminal end portion 90 of said cam link member 86 with the drive pin 72 mounted on the terminal portion 70 of the operating member actuating arm 68. The above described limited rotative displacement of the operating member actuating arm 68 effected by the initial advance of the piston rod 80 is sufficient to place the dependent drive boss 74 in the path of advance of the inclined operating surface of the advancing drive wedge 82. Continuing advance of the piston rod 80 and drive wedge 82 results in engagement of said now displaced dependent drive boss 74 by said wedge operating surface and in continued and further counter-clockwise rotational displacement of the operating member 64 and concomitant advance of the crimping die members 56 into the bore 50 in accordance with piston rod advance.

With the above described structure, crimp depth control can be effected by controlling the degree of advance of said piston rod 80 in accordance with the selective dictates of the workpiece being fabricated. In the instant embodiment such is provided by the drive assembly in conjunction with a selectively positionable control member and to which subject we now turn.

Piston rod displacement is effected by the double acting pneumatic cylinder 76, the operation of which is closely controlled by a manually operable poppet actuated plunger valve and a second poppet valve selectively actuated by the degree of piston rod advance. As clearly shown in FIGURES 3 and 4, the cylinder 76 is provided with first and second air entry ports 110 and 112 selectively connected by channels 114 and 116 to the upper and lower ends thereof. Disposed intermediate the entry ports 110 and 112 is a venting or exhaust port 118 communicating to the atmosphere through channel 120. The valve assembly 18 (see FIGURE 1) includes a valve housing 122 having a displaceable plunger or spool 124 mounted in the bore 126 thereof. The plunger 124 is provided with a radial recess 128 to accommodate, as by a loose fit, the spring biased stem 130 of a valve operator or slide 132. The slide 132 is conventionally shaped to selectively cover the vent port 118 and either of the entry ports 110 and 112 dependent upon the longitudinal positioning thereof. The recess 128 in the plunger body 124 is connected by suitable longitudinally disposed internal channels 134, 136 to the portions of bore 126 disposed both above and below said plunger body 124.

The upper terminus of the bore 126 is closed by a first poppet valve assembly, generally designated 138, having a displaceable ball member 140 normally biased in sealing engagement against a sealing surface by a spring 142 and thereby closing the upper terminus of the bore 126. The poppet valve ball 140 is adapted to be displaced out of sealing engagement with its sealing surface by depression of a poppet pin 144 in response to rotative displacement of the trigger member 20 to vent the upper portion of the bore 126 to the atmosphere through channel 148. The trigger 20 is pivotally mounted to the housing, as at 150, and is normally biased in the counter-clockwise direction, as illustrated in FIGURE 3 by a biasing spring 152. The portion of the bore 126 disposed on the underside of the plunger 124 is connected by a channel 154 to one end of an air hose 156 disposed within the trigger guard member 22.

Figure 14:
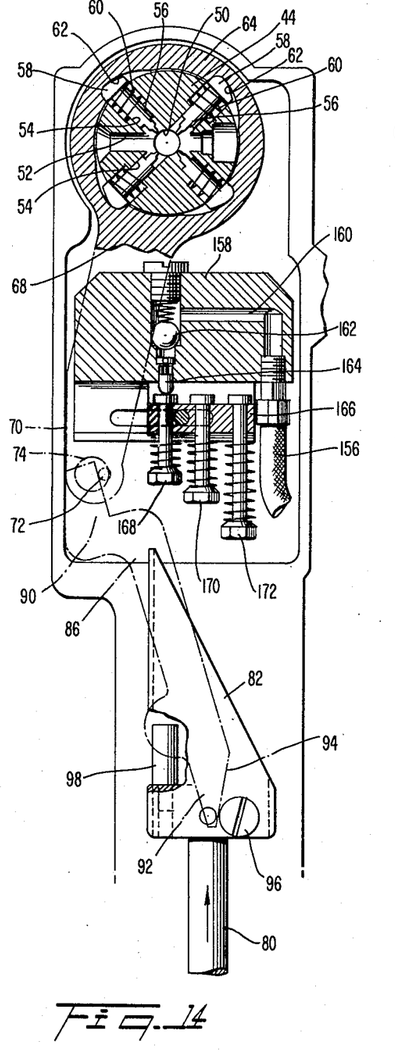
FIGURES 14 and 15 are sectional views illustrating the positioning of the crimping die members at varying points in the operational cycle.
Figure 15:
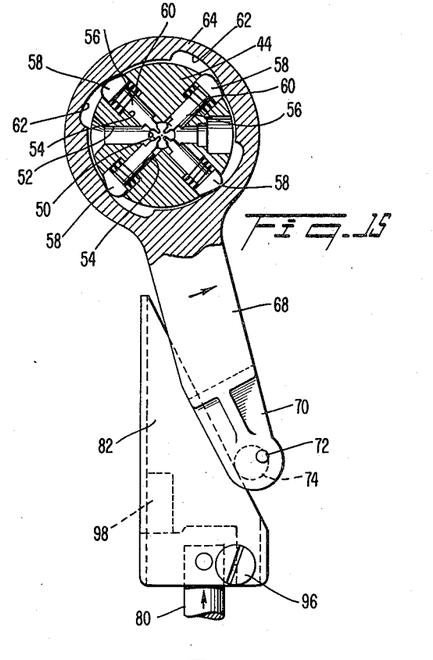

The other end of the hose 156 is connected to a second poppet valve assembly, generally designated 158 (see also FIGURES 8 and 14), which is disposed in the path of advance of the piston rod 80. More specifically and as best illustrated in FIGURE 14, the end of the hose 156 is connected to a channel 160, the exit end of which is normally closed by the spring biased poppet valve ball 162. The ball 162 of the second poppet valve assembly 158 is adapted to be displaced out of sealing engagement with its sealing surface by a longitudinally displaceable poppet pin 164 disposed in the path of advance of the aforementioned stud 98 mounted on the piston rod 80 beneath the wedge 82.

In order to provide for selective displacement of the poppet pin 164 and ball 162 in accordance with varying degrees of longitudinal advance of the piston rod 80, there is provided an interposed horizontally displaceable slide 166 having a plurality of spring biased stud members 168, 170 and 172 of varying length displaceably mounted thereon. The details of this slide assembly will be hereinafter described, however, for present purposes, it may be understood that any one of the varying length studs 168, 170 and 172 may be selectively interposed in the path of longitudinal advance of the stud 98 so as to be engaged and displaced thereby and effect displacement of the poppet pin 164 and ball 162.

In utilization of the subject tool, air pressure is continually available by means of the supply hose 26 at the valve assembly entry port 28. At the start of a cycle, the above described parts will be positioned as illustrated in FIGURE 3. With the parts so positioned, the supply air pressure is applied, through channel 174, slide channel 176, slide stem recess 128 and valve plunger channels 134 and 136 to the portions of the bore 126 disposed both above and below the plunger 124. Under such balanced pressure condition the plunger 124 will remain at rest. Under such condition a manual rotative displacement of the trigger 20 against the action of its biasing spring 152 results in a depression of the poppet pin 144 and a concomitant displacement of the ball 140 off its sealing surface against the countervailing action of its biasing spring 142. With the ball 140 so displaced, the upper portion of the bore 126 is vented to the atmosphere through channels 148 effecting a drop in pressure in the portion of the bore 126 disposed above the plunger body 124. This drop in pressure creates a pressure differential across the plunger body that effects a displacement of the plunger body 124 toward the poppet valve 138. Such plunger body displacement effects a concomitant displacement of the slide 132 to uncover the port 110 to the air supply and to convert the channel 116 to the vent channel 120. Additionally, such displacement opens the channel 154 permitting application of the supply pressure to the ball 162 of the second poppet valve 158 via the hose 156 and channel 160. The opening of the port 110 permits application of the supply pressure to the underside of the piston 78 and effects a longitudinal advance of the piston rod 80 and consequent rotative displacement of the operating member 64 relative to the dieholder 44 to effect crimping die advance as described heretofore.

A release of the trigger 20 after initiation of piston rod advance as effected by the aforesaid displacement thereof permits its biasing spring 152 to effect a counterclockwise displacement thereof and a concomitant reseating of the poppet valve ball 140 against its sealing surface by its biasing spring. The reseating of the ball 140 closes the vent channels 148 and results in a reestablishment of pressure equilibrium on both sides of the plunger body 124 within the bore 126.

Piston rod advance will continue until the stud 98 disposed beneath the cam wedge 82 engages one of the selectively positionable studs 168, 170, 172 mounted on the slide 166 disposed in the path of advance thereof. Continuing displacement of the piston rod 80 results in displacement of the engaged stud, say 168 for example, and concomitant displacement of poppet pin 164 disposed in longitudinal alignment therewith and in a lifting of the second poppet valve ball 162 from its seat. The lifting of the ball 162 from its seat effectively vents the hose 156 to the atmosphere through the channel 175 (as best shown in FIGURE 8). The venting of the hose 156 results in a pressure drop within the portion of the bore 126 disposed beneath the now advanced plunger body 124 and in the creation of a pressure differential across said plunger body, with the higher pressure now being extant on the upper surface thereof. Such pressure differential will now result in a downward or return displacement of the plunger body 124 and slide 132. Such downward displacement of the plunger body 124 and slide 132 closes channel 154, uncovers the cylinder entry port 112 and connects cylinder entry port 110 to the vent port 118. The uncovering of cylinder entry port 112 permits the supply air pressure to be applied to the upper surface of the piston 78, and such, coupled with the venting of the under side thereof results in a positively actuated retraction of the piston 78, piston rod 80 and the aforedescribed drive wedge and stud members secured thereto. Such retraction permits the ball 162 of the second poppet valve 158 to be reseated by its biasing spring and thereby return the control system to its starting condition.

As will be apparent from the above, crimp depth control in the subject construction is determined by the length of advance of the piston rod 80 and such in turn is selectively controlled by the interposition of one of a plurality of varying length studs, i.e. 168, 170 or 172, in the path of advance thereof. FIGURES 5, 6, 8 and 14 best illustrate the constructional arrangement of elements to effect the selective positioning of the studs 168, 170 and 172 in the path of advance of the piston rod 80 for controlling crimp depth in accordance with the selective dictates of the workpiece undergoing fabrication. As best illustrated in FIGURE 8 the slide 166 is slideably mounted in a complementally shaped recess 176 in the base of the second poppet valve 158. The slide 166 is connected by a pin 178, which passes through a suitable slot in the cast frame 34, to a link slide 180 disposed in the heretofore defined area B. The link slide 180 is positioned by suitable bolts 182, 184 riding in elongate slots 186, 188 respectively and is biased at one limiting position by a spring 183. The link slide 180 is provided with an extension 185 that extends through an aperture 187 in the frame wall 240. As will be later described the extension 185 is engageable by the preformed supply cartridge 24 containing the carrier strip mounted electrical contact elements and the link slide 180 is thereby automatically and selectively positioned in accordance with the dictates of the cartridge container contact elements by cartridge securement to the tool.

It will also be apparent from the above that a return displacement of the advanced piston rod 80 cannot be effected without release of the trigger member 20. If the trigger member 20 is maintained in depressed condition after initiation of piston rod advance, the upper portion of the bore 126 will be continually vented to the atmosphere through the channels 148 and the lower portion of the bore 126 will be continually vented to the atmosphere through the hose 156 and open poppet valve 158 with the piston rod 80 remaining stationary at its limit of advance as determined by the abutting engagement of the stud 98 with the interposed stud, say 168, and displaced poppet pin 164. The subject construction thus provides an effective full cycling control wherein operations upon a given workpiece must be completed prior to the permitted initiation of operations upon a subsequent workpiece.

*Carrier strip assembly*

Although varying forms of electrical contact member carrier strips may be employed, FIGURES 2a, 2b and 2c generally illustrate the essentials of a presently preferred construction for a carrier stip assembly for electrical pin and socket contact elements adapted for use in the subject tool.

The illustrated presently preferred construction for an electrical contact member carrier strip is in the form of an elongate flexible belt made up of predetermined pluralities of selectively shaped link members, generally designated 190, interconnected in uniform spaced relation by integral web-like spacing members 192.

Also shown, by way of general illustration and for example purposes, is one conventional proprietary design configuration for a pin type electrical contact member 194. Such pin type unit includes a tubularly shaped wire receiving portion 196 and an integral dependent pin portion 198. Disposed at a predetermined location on the external surface of the wire receiving portion 196 is a positioning shoulder or flange 200. The subject pin type contact member is intended to be illustrative of only one of many such members of proprietary design configuration. Insofar as the present invention is concerned, all that is required of such pin type contact element or, for that matter, the complementally shaped mating socket type element, is the provision of an externally disposed positioning flange, such as the illustrated flange 200, in order to properly position the unit relative to the carrier strip so as to effect the proper disposition thereof relative to the advancing crimping dies when such unit is disposed within the operating location defined by the bore 50 of the dieholder 44.

As illustrated, each link member 190 includes a generally cylindrically shaped body portion 202, an enlarged and flange shaped upper portion 204 and an integral dependent sleeve portion 206. The body, flange and sleeve portions are provided with an axially disposed bore 208 selectively shaped to releasably receive electrical pin or socket contact members of any proprietary design configuration. Such axial bore 208, however, is terminally sized to provide for abutting disposition of the positioning shoulder or flange 200 of the contact member on the upper surface of the link so as to uniformly position such contact member longitudinally of the link member with the wire receiving portions 196 thereof extending from the link members, as illustrated.

In order to provide for indexing and feed of the carrier strip mounted contact members, the sides of the cylindrically shaped body portion 202 of each of the subject web connected link members 190 are shaped to provide partial chordal flats 216, disposed parallel to each other and defining a pair of peripheral shoulders 210, 212 disposed on either side of a guide channel 214. The shoulders 210, 212, as will be hereinafter described, serve as index and stop member engaging surfaces, whereas the guide channel 214 accommodates a pair of guide bars in order to properly position said link member and contact elements mounted thereon during their advance through the transmission channel 52 in the dieholder 44.

The above described belt or carried strip of web interconnected link members is readily and inexpensively molded from suitable plastic materials, such as polyethylene or nylon. An assembly as so constituted provides for a uniform spacing intermediate the center lines of the adjacent exposed wire receptacle portions 196 of the strip mounted electrical contact members 194 to permit sequenced cyclic introduction thereof into the operating location defined by the bore 50 of the dieholder 44, and yet provide sufficient flexibility to permit ready manipulation, such as convolute winding of such carrier strip for both compact storage and for strip feed operations.

*Contact member index and feed assembly*

Indexing and feeding of the carrier strip mounted electrical contact members is generally effected by the reciprocation of a spring biased index block assembly primarily located in the area B disposed intermediate the body casting 34 and lower coverplate 32. Such assembly is adapted to be lineally displaced in one direction, against the action of a biasing spring, by the rotative displacement of the operating member 64 effecting crimping die advance; latched in such displaced position during the return rotative displacement of said operating member 64 by the presence of the now deformed contact member in the operating location; and unlatched by the removal of the deformed workpiece from said operating location and consequently displaced in the other direction by its biasing spring to effect carrier strip advance and introduction of the lead carrier mounted contact element into said operating location.

To the above ends, and as best shown in FIGURES 5 through 8 there is provided a generally T-shaped index block gib 226 fixidly mounted on the cast body 34 by a countersunk screw 227 and disposed parallel to the direction of carrier strip advance. Mounted on the gib 226 and displaceable longitudinally thereof is an index block member 228. Extending from the forward end of the index block 228 is a stud 230 drivingly engaged by a drive pin 232 which is mounted on the rotatably displaceable operating member 64 for the dieholder 44 and extends through an arcuately shaped accommodation aperture 234 in the frame or body casting 34. The stud 230 is biased into operative engagement with the drive pin 232 by a compression spring 236 disposed intermediate the rearward end of the index block 228 and the wall 240 of the body casting 34.

Disposed substantially parallel to the gib 226 is an index stop link, generally designated 242. The link 242 is pivotally mounted as at 244, biased in the clockwise direction (as viewed in FIGURES 5 through 7) by a spring 246 and limited in its permitted arcuate displacement by a guide screw 248 riding in an acurate recess 250 therein. The link 242 is additionally provided with a generally rectangularly shaped recess 252 having a latching shoulder 254 dependent from one of the defining surfaces thereof and positioned to be engaged by a latching pin 256 mounted on the undersurface of the overhanging dependent end of the index block 228. The end of the link 242 disposed remote from the pivotal mounting 244 thereof is provided with an inclined operating surface 258.

Operatively associated with the above described index block member 228 and index stop link 242 is a sensing link displaceably responsive to the presence of a carrier strip mounted electrical contact member disposed in the operating location as defined by the bore 50 in the dieholder 44. The sensing link is in the form of a generally E-shaped member 260 normally biased towards the gib 226 by a spring 262. The upper extending arm 261 of the E-shaped link 260 is positioned by suitable screws 264, 266 riding in longitudinally disposed slots 268, 270 therein. The lower extending arm 263 of the E-shaped link 260 is similarly positioned by screws 272, 274 riding in slots 276, 278 therein. The link member 260 is additionally provided with a dependent basal extension 280 having an extending pin 282 mounted thereon and positioned to operably engage the inclined operating surface 258 on the terminal end of the aforesaid index stop link 242. The extending mid-arm of the link 260 is in the form of a sensing finger 286 mounted on the base of a generally U-shaped section 284 so as to be disposed remote from the plain of the remainder thereof. More specifically, the sensing finger is positioned to engage and be displaced by the extending wire receiving portions 196 of the lead carrier strip mounted contact element 194 when the same is disposed in the operating location. The U-shaped mount 284 permits the carrier strip, per se, to be displaced therethrough and out of the tool through aperture 285.

Figure 6:
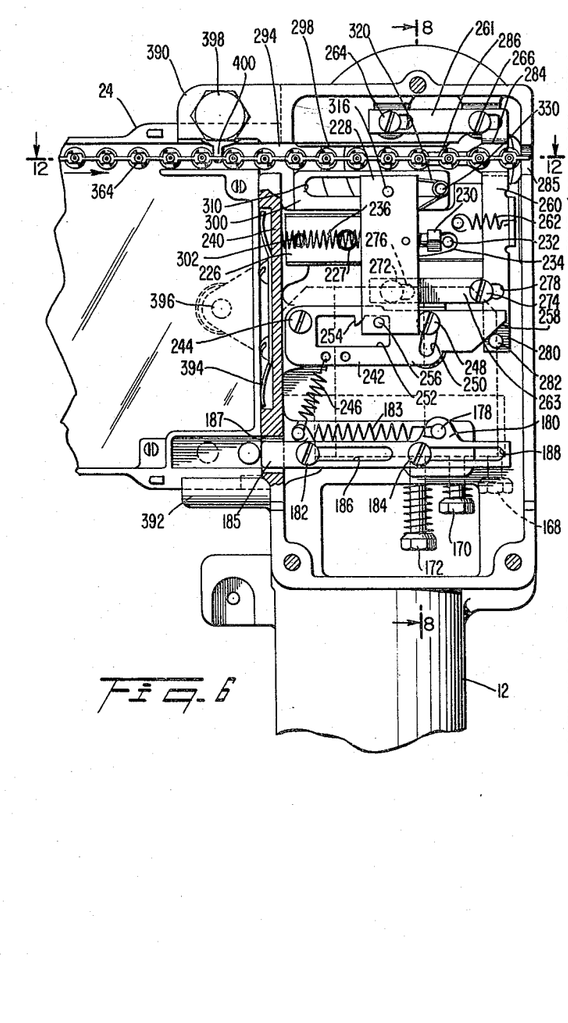
FIGURE 6 is a view similar to FIGURE 5 and illustrating elements after cartridge securement and disposition of a carrier strip mounted electrical contact element in the operating location.
Figure 7:
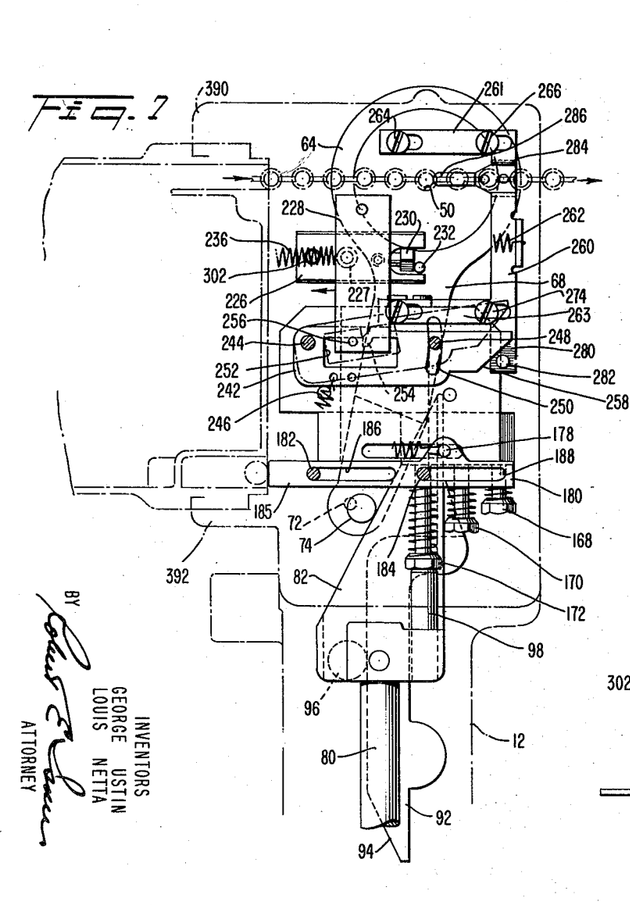
FIGURE 7 is a fragmentary view, similar to the showing of FIGURES 5 and 6, the positioning of certain components at a different point in the operational cycle.

In operation of the above described component, a rotative displacement of the operating member 64 relative to the fixed dieholder 44 in the direction effecting crimping die advance results in the displacement of the index block 228 from its advanced to its retracted position and against the countervailing action of its biasing spring 236, through the engagement of the drive pin 232 with the stud 230. As illustrated in FIGURE 6, the presence of an electrical contact member within the bore 50 of said dieholder 44 (which is undergoing deformation during the aforesaid crimping die advance) causes the sensing link 260 to be displaceably positioned to the right (as viewed in FIGURE 6) against the action of its biasing spring 262. With the sensing link 260 so positioned, the above described retractive displacement of the index block 228 will cause the pin 256 to be displaced behind the latching shoulder 254 of the index stop link member 242, with such index stop link 242 being rotatably displaced in the counterclockwise direction (as viewed in FIGURE 7) during the course thereof. With the pin 256 disposed behind the latching shoulder 254, the index block 228 will be latched in its retracted position and the spring 236 will be in a compressed state. Index block 228 will remain in such latched retracted position during the return displacement of the operating member 64 and concomitant retraction of the crimping dies. A manual removal of the now deformed electrical connector from the operating location 50 through the wire entry aperture 16, removes such contact from the carrier strip and effectively disengages the contact of sensing finger 286 therewith. The disengagement of the sensing finger 286 permits the sensing link 260 to be displaced, by its biasing spring 262, toward the now retracted and latched index block 228. Such displacement of the sensing link 260, in addition to reintroducing the end of the sensing finger 286 into the bore 50 of the dieholder 44, effects counterclockwise rotative displacement of the index stop link 242, through the engagement of the drive pin 282 with the inclined operating surface 258 thereof. Such counterclockwise displacement of the index stop link disengages the latching shoulder 254 from the pin 256 and unlatches said index block 228. When so unlatched, the compression spring 236 will displace the index block 228 forwardly to its advanced position. As will be hereinafter described, such advancing displacement of the index block effects a concomitant advance of the carrier strip and contact elements mounted thereon sufficient to introduce the next succeeding carrier strip mounted electrical contact element into the operating location as defined by the bore 50. Such introduction of the next succeeding carrier strips mounted contact element therein effects a displacement of the sensing link 260, against the action of its biasing spring 262, to the position illustrated in FIGURE 6, which in turn permits the index stop link 242 to rotatably return to its latching position under the influence of its biasing spring 246, thus resetting the system for a succeeding cycle, initiated by the rotative displacement of the operating member 64 effecting deformation of the workpiece now disposed in the operating location.

Figure 10:
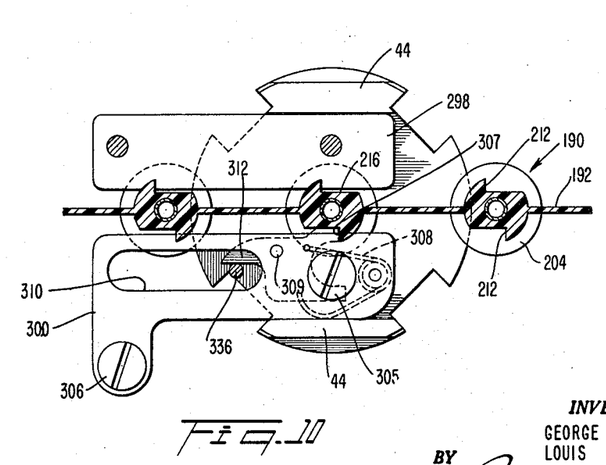
FIGURE 10 is a sectional view taken on the line 10—10 of FIGURE 9.

The above described reciprocative displacement is utilized to advance carrier strip mounted electrical contact members through the carrier strip entry aperture 294 in the frame, through a coaligned channel 296 in the operating members 64 and through the coaligned transmission channel 52 in the dieholder 44 to introduce the extending wire receiving portion 196 thereof into said operating location as defined by the bore 50. As best shown in FIGURES 5 through 12, there are provided coplanar upper and lower guide plates 298 and 300 respectively disposed transverse to the axis of the bore 50, the facing edges of which are sized and spaced to be contained within the channels 214 disposed intermediate the extending shoulders 210, 212 on the sides of the carrier strip link members and to thereby guide said carrier strip and contact elements mounted thereon in its longitudinal advance. As illustrated, the upper guide plate 298 is secured to the rear surface of the dieholder 44. The lower guide plate 300 is secured to the frame 34 as at 302 and to the dieholder as at 305 (see FIGURES 3, 8 and 10). Disposed intermediate the lower guide plate 300 and the rear of the dieholder 44 is a carrier stop member 304. The carrier stop member 304 is pivotally mounted on a pin 309 on the lower guide plate 300 and is provided with an extending lug 307 that is positioned to engage the shoulders 210 of the individual successively arranged link members and prevent undesired retraction thereof. The lug 307 of the pivotally mounted stop member 304 is normally biased into engagement with the carrier strip link members by a torsion spring 308 disposed intermediate the undersurface of said stop member 304 and the wall of the dieholder 44. As best shown in FIGURE 10, the lower guide member is provided with an elongate longitudinal slot 310 which overlies an extension 312 on said stop member.

Figure 11:
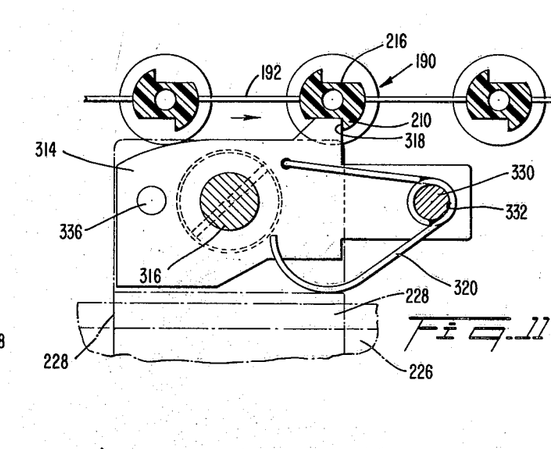
FIGURE 11 is a sectional view taken on the line 11—11 of FIGURE 9.

Advance of the carrier strip is effected by an indexing link 314 pivotally mounted as at 316, on the undersurface of the index block 228. As best shown in FIGURE 11, the indexing link 314 is provided with a carrier link member engaging lug 318 which is normally biased into engagement with the shoulders 212 on the carrier strip link members by a torsion spring 320 disposed intermediate said index link 314 and the index block 228. As will be apparent from the drawings, the index link 314 is displaceable in conjunction with the index block 228. As said index block 228 is retracted by the rotative displacement of the operating member 64 effecting crimping die advance, as heretofore described, the indexing lug 318 will be disengaged from the shoulder 212 of one link member and will be displaced rearwardly, pivoting about point 316 into driving engagement with the shoulder 212 of the next succeeding link member. Upon subsequent advance of the index block 228, as heretofore described, the index link 314 will advance concurrently therewith and the driving engagement of the lug 318 with the now engaged shoulder 212 of the next succeeding carrier strip link member will effect a concomitant advance of the carrier strip by an amount equal to the length of advance of the index block 228.

In contradistinction with the above, the carrier stop link remains fixed in position irrespective of location of the index block 228. The extending lug 306 on said stop link 304 is biased in engagement with the shoulder 210 of one of the link members and will remain in engagement therewith during the retractive displacement of the index block 228 and index link 314 as described above. During the advance of the index block 228 and index link 314, the concomitant advance of the carrier strip will result in disengagement of the lug 306 from the carrier link shoulder, rotative displacement of the stop link 304, occasioned by carrier strip advance therepast, and engagement of the lug 306 behind the shoulder 210 of the next succeeding carrier link member.

Through the above described structure and operation thereof, it will be seen that retraction and advance of the index block 228 effects a concomitant cyclic incremental advance of the carrier strip to sequentially introduce the uniformly spaced electrical contact members mounted thereon into the operating location.

Figure 12:
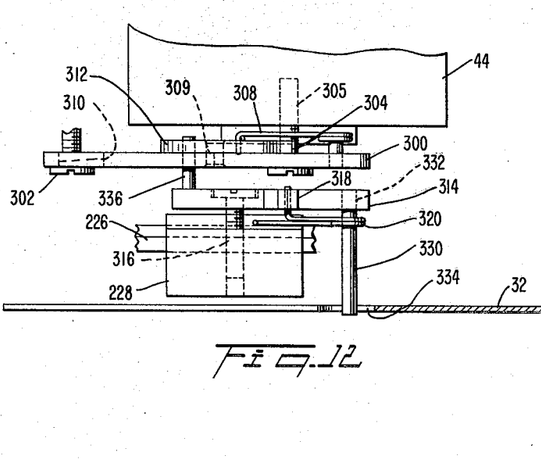
FIGURE 12 is a sectional view taken on the line 12—12 of FIGURE 9 with the carrier strip removed.
Figure 16:
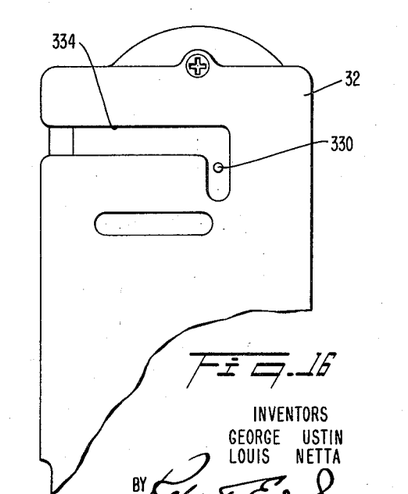
FIGURE 16 is a fragmentary bottom view showing the location of the carrier strip release pin.
Figure 17:
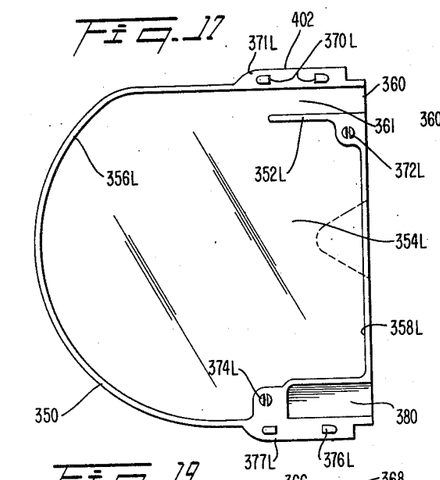
FIGURE 17 is a plan view of the interior of a half segment of a supply cartridge of preferred construction.
Figure 18:
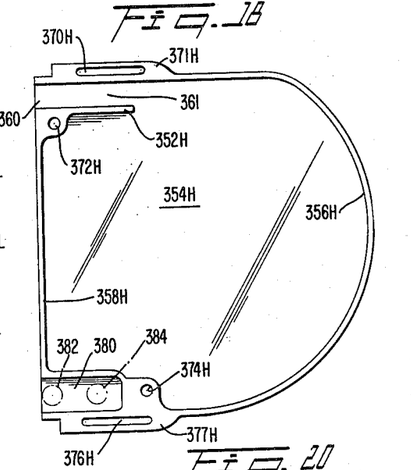
FIGURE 18 is a plan view of the interior of the other half segment of the supply cartridge of preferred construction.

Also included in the above described construction is auxiliary, manually operable means for effecting a withdrawal of the carrier strip from the tool when desired. To this end, there is provided a carrier strip release pin 330 mounted in a terminally disposed aperture 332 in the indexing link 314 which extends outwardly through a slot 334 in the lower cover plate 32 (see FIGURE 16) for manual manipulation thereof. As best shown in FIGURES 5, 6, 11 and 12 the carrier strip release pin 330 additionally serves as a hub for the torsion spring 320 for the indexing link 314. A manual displacement of said carrier strip release pin 330 in a downward direction as seen in FIGURES 11 and 16 effects a concomitant rotative displacement of the indexing link 314 about its pivotal mounting 316 in an amount sufficient to effect disengagement of the lug 318 from the shoulders of the carrier strip links disposed within the unit. The rotative displacement of said indexing link 314 is transmitted through a connecting pin 336 to the stop link 304. As best illustrated in FIGURES 10 to 12, the connecting pin 336 extends through the slot 310 in the lower guide member and is disposed adjacent the underside of the extension 312 of the stop link 304. The above described rotative displacement of the index link 314 is thus transmitted into a concomitant rotative displacement of the stop link 304 to effect the disengagement of the stop lug 306 from the shoulder 210 of the carrier strip link member. Through the above described linkage, a manual displacement of the carrier strip release pin 330 effects sufficient rotative displacement of the index link 319 and stop link 304 to disengage the lugs 318 and 307 thereof from the shoulders of the carrier strip link members and to permit retractive withdrawal of said carrier strip from the tool.

*Preformed cartridge supply means*

Although the subject tool is well adapted for utilization as a bench mounted unit employing elongate and effectively endless lengths of carrier strip mounted electrical contact elements, the preferred utilization thereof is as a portable tool employing a releasably securable preformed package or cartridge, containing a predetermined plurality of carrier strip mounted electrical contact elements, as a contact element component supply.

FIGURES 17 through 25 illustrate the details of a presently preferred construction for a preformed supply package or cartridge adapted for releasable securement to the subject tool. As illustrated in FIGURES 17 to 20, the cartridge is preferably formed by a joinder of a pair of complementally shaped mating halves or sections, each preferably formed of a transparent or translucent, readily moldable plastic material, suitably medium impact polystyrene which may be color tinted for code identification purposes. More specifically, there is provided a pair of complementally shaped dish-like mating sections, conveniently designated as a left hand section 350 and a right hand section 351. Each section is formed of a base portion 354L, 354H and a peripheral surrounding flange-like generally semi-circularly shaped wall portion 356L and 356H having a diametrically disposed tool abutting section 358L and 358H. Mated securement of the left hand and right hand cartridge sections is readily effected by a plurality of integral plug and socket connector elements, such as the plug 370L and socket 370H; plug 372L and socket 372H; plug 374L and socket 374H and plug 376L and socket 376H. As illustrated the plugs and sockets 370H, 370L and 376H, 376L may conveniently be located in raised bosses or projections 371L, 371H and 377L, 377H which can serve as guide means for the hereinafter described cartridge insertion.

Disposed at one terminus of the tool abutting section 358L and H is a carrier strip delivery aperture 360 and delivery channel 361 leading thereto, formed of internally disposed shoulders 352L and H disposed parallel to and in spaced relation to the adjacent portion flange-like side walls 356L and H.

Figure 24:
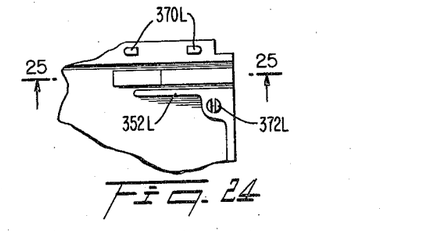
FIGURE 24 is an enlarged view of a modified configuration of the strip delivery portion of an assembled supply cartridge.
Figure 25:
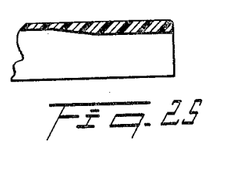
FIGURE 25 is a section on the line 25—25 of FIGURE 24.

The facing surfaces of the strip delivery channel 361 and delivery aperture 360 should be sized to closely accommodate the enclosed carrier strip and contact elements mounted thereon, as generally designated 364 so as to position and orient the same relative to upper and lower guide plates 298 and 300 upon carrier displacement from the cartridge. FIGURES 24 and 25 illustrate a convenient expedient for selectively sizing the delivery channel 361 and delivery aperture 360 as by varying the wall thicknesses so as to properly position carrier strips and mounted contacts of varying dimension.

Figures 19, 20, 21, 22:
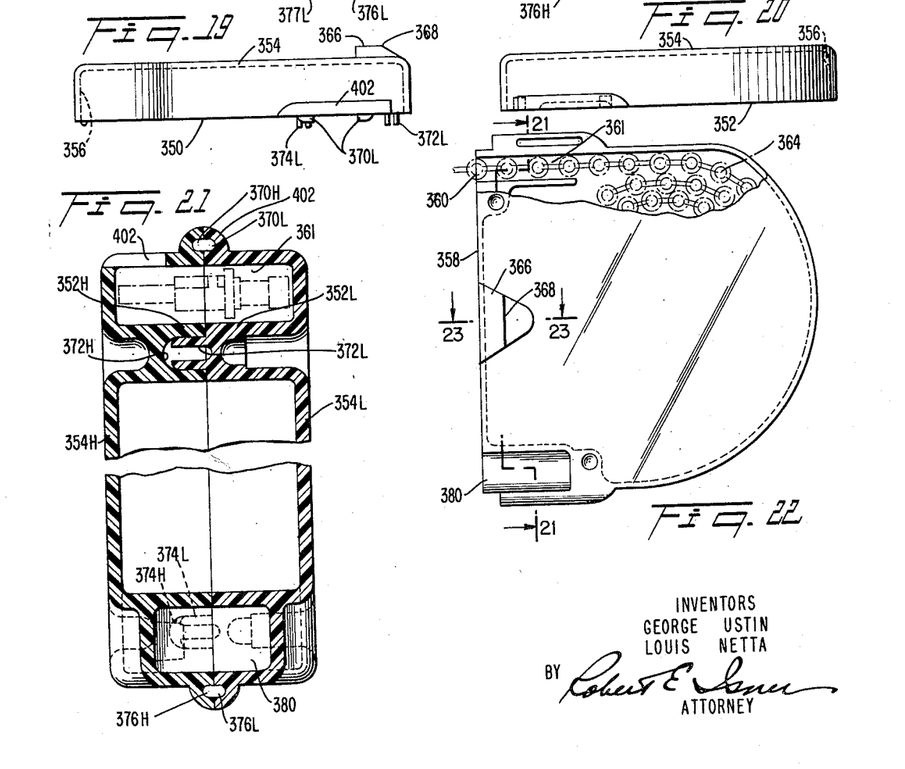
FIGURES 19 and 20 are side elevational views, respectively, of the supply cartridge construction illustrated in FIGURES 17 and 18.
FIGURE 21 is a vertical sectional view taken on the line 21—21 of FIGURE 22 of a supply cartridge formed by assembling the previously illustrated segments.
FIGURE 22 is a plan view of the assembled supply cartridge shown in FIGURE 21.
Figure 23:
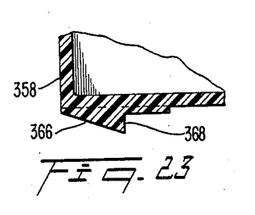
FIGURE 23 is an enlarged sectional view as taken on the line 23—23 of FIGURE 22.

As best shown in FIGURES 17, 19, 22 and 23, there is provided an integral externally disposed positioning boss on the outer surface of the left hand section 350 adjacent to the flat tool abutting wall surface 358 thereof. As best shown in FIGURES 22 and 23, such boss is formed to provide an inclined surface 366 terminating in a perpendicularly disposed retaining shoulder 368.

In order to effect automatic positing of the crimp depth control slide 166 through displacement of the extending arm 185 of the link slide 180 by cartridge securement, the illustrated cartridge is provided with an integral link slide receiving recess 380 disposed at the outer terminus of the tool abutting wall 358. Molded within said slide link receiving recess 380 and selectively located therein to effect the desired degree of displacement of the link slide 180 upon releasable securement of the cartridge to the tool in accordance with the character of the contained carrier strip and contact elements mounted thereon, as will be hereinafter described, is a single selectively located positioning pin, such as the dotted pin 382, 384. It being understood, however, that only one of such pins will be included in any cartridge and that such pin will be selectively positioned to effect the desired degree of displacement of the link slide 180 necessary to properly locate the desired crimp depth control stud 168, 170 or 172 in the path of advance of the piston rod 80.

Figure 5:
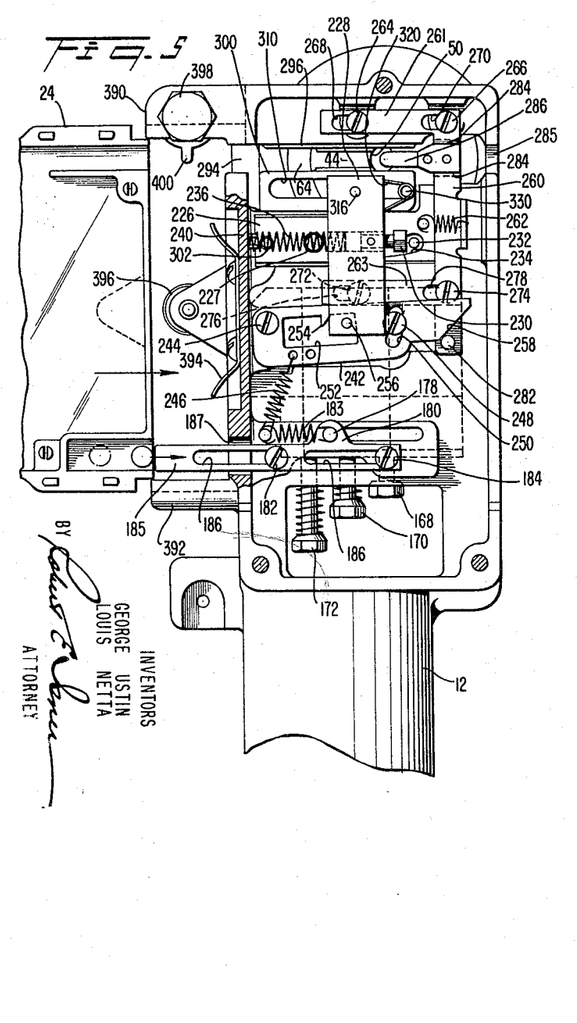
FIGURE 5 is a bottom view, partly in section, illustrating the disposition of certain of the crimp depth control components and the contact member index and feed assembly prior to cartridge securement.

As best shown in FIGURES 1, 3, 4, 5 and 6, releasable securement of the above described preformed cartridge containing a predetermined number of carrier strip mounted contact elements to the tool is effected by placing the wall formed by the tool abutting sections 358L and H in abutting relation against the frame wall 240 of the subject tool. As illustrated, the cast tool body is provided with a cartridge receiving socket as defined by the extending standards 390, 392 into which the cartridge is introduced. As best shown in FIGURES 5 and 6, a leaf spring 394 is mounted on the external surface of the wall 240 which is adapted to be deformed by manual disposition of the cartridge in abutting relation with said wall 240. Associated therewith is a spring biased retaining stud 396 which is adapted to ride up the inclined surface 366 of the positioning boss on the cartridge and be disposed in latching engagement behind the shoulder 368 once said cartridge is properly disclosed in abutting secured relation with the tool. When so positioned, the carrier strip delivery aperture 360 of the cartridge will be disposed in proper longitudinal alignment with the entry aperture 294 in the frame casting 34 and the carrier strip 364 exiting therefrom will be properly disposed relative to the guide plates 298 and 300 to control and properly position the strip within the tool during its advance.

In order to effect initial carrier strip delivery from the cartridge into the tool for engagement with the heretofore described indexing means, there is provided a rotatable stud 398 mounted on a standard 390 having a dependent finger 400 sized to pass through an aperture 402 (see FIGURE 21) in the assembled and secured cartridge and to engage the dependent sleeve portions 206 of the individual link members of the carrier strip 364. Such stud 398 and finger 400 connected therewith is rotatable through 360° and, as a consequence of manual rotation thereof, the carrier strip 364 will be manually advanced one link length during each 360° rotation thereof.

*Operation*

By way of further disclosure, a brief description of the tool operation is provided.

Tool loading is effected by selection of a preformed cartridge 24 containing a predetermined plurality of specifically sized carrier strip mounted electrical contact elements of proprietary design configuration, and disposition of the tool abutting flat wall portion thereof, formed by sections 358L and H, against the cast frame wall 240 within the cartridge receiving socket defined by the standards 390, 392. Such cartridge insertion will effect a deformation of the leaf spring 240. When so positioned, the cartridge will be releasably latched in position by disposition of the spring biased stud 296 behind the shoulder 368 on the latching boss of the cartridge. As described earlier, such cartridge insertion will automatically effect a selective positioning of the crimp depth control slide 166 by displacement of the link slide 180.

Introduction of the lead end of the cartridge contained carrier strip 364 into the tool body is effected by manual rotation of the carrier strip feed stud 398 rotatably mounted on the standard 390. Such rotation of the stud 398 through engagement of the feed finger 400 with the sleeve portions 206 of the carrier strip links effects carrier strip advance and introduction of the lead contact member bearing link member into guided engagement with the upper and lower guide plates 298 and 300. Strip advance continues until the lead strip mounted carrier element is introduced into the operating location as defined by the bore in the dieholder 44.

When the wire receiving portion of the lead contact element is introduced within the bore 50 of the dieholder 44, the sensing link 260 will be displaced against the action of its biasing spring 262 in such manner as to dispose the pin 282 mounted on the dependent end thereof out of engagement with the inclined surface 258 on the index stop link 242, thus permitting said index stop link 242 to assume its latching position.

The advance of the carrier strip as described above also places said strip into operative engagement with the index link 314 and stop member 304.

With the lead strip mounted contact element so positioned, workpiece formation is effected by insertion of the insulation stripped terminal end of a lead wire through the wire guide means 48 into the aligned wire receiving portion 196 of the contact element. After such workpiece formation, a depression of the trigger 20 results in selective admission of air to the power cylinder 76 in such manner as to effect advance of the piston rod 80. The initial advance of the piston rod 80 effects (a) a preliminary rotative displacement of the operating member 64 through engagement of the drive wedge mounted stud 96 with the operating surface 92 of the pivotally mounted link cam member 86; (b) an initial advance of the crimping dies 56 into the bore 50 of the dieholder 44; and (c) an initial retraction of the index block 228 by engagement of the drive pin 232 with the index block stud 230. The initial rotative displacement of the operating member 64 results in the introduction of the dependent drive boss 74 mounted on the extending arm 68 thereof into the path of advance of the piston rod mounted drive wedge 82. Continuing piston rod advance effects further rotative displacement of said operating member 64 relative to the dieholder 44 further advancing of the crimping dies 56 and further retraction of the index block 228.

Such rotative displacement of the operating member will continue until the stud 98 disposed beneath the drive wedge 82 displaces the selected one of the studs 168, 170 or 172 that is disposed in the path of advance thereof. Upon displacement of the selected stud 168, 170 or 172 by the stud 98, the second poppet valve 158 is actuated through the displacement of the poppet pin 164 to stop piston rod advance and to thereby limit the depth of crimp introduced into said workpiece. Prior to the cessation of piston rod 80 advance, the index block 228 will be latched in retracted position by disposition of the latching pin 256 behind the latching shoulder 254 and during the retractive displacement thereof the indexing feed link 314 will be displaced in conjunction therewith so as to introduce the lug 318 thereof behind the shoulder 212 on the next succeeding link member of the carrier strip.

The actuation of the second poppet 158 automatically effects retraction of the piston rod 80 with a concomitant return rotative displacement of the operating member 64 to its initial or starting position and retraction of the crimping dies 56 from the bore 50 in the dieholder 44.

When the operating member 64 has returned to its starting position and the crimping dies retracted, a manual removal of the now deformed workpiece through the wire guide means 48 effects a disengagement of the sensing link finger 286 therewith and permits said sensing link 260 to be displaced, by its biasing spring 262, toward the now retracted index block 228. Such permitted displacement of the sensing link 260 results in a delatching rotative displacement of the index stop link 242 through engagement of the sensing link pin 282 with the inclined operating surface 258. This rotative displacement of the index stop link 242 effects a disengagement of the latching pin 256 from the latching shoulder 254 and permits said index block 228 to be advanced by its biasing spring 236. The advance of the index block 228 and the concomitant advance of the indexing link 314 pivotally mounted thereon effects a concomitant advance of the carrier strip 364 through engagement of the indexing link stud 318 with the drive shoulder 212 on the now engaged link member of the carrier strip. Such advance of the carrier strip 364 results in introduction of the next succeeding carrier strip mounted contact element 190 into the bore 50 of the dieholder 44 and concomitant displacement of the sensing link 260 away from the index block 228, thus resetting the contact member indexing and feed assembly for a further cycle of operation initiating by depression of the trigger 20.

Figure 26:
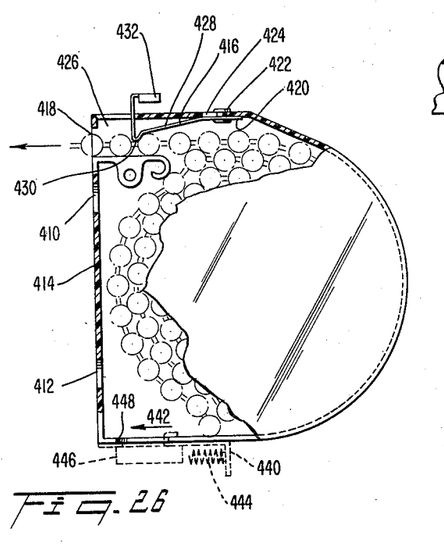
FIGURE 26 is a plan view of an alternative construction for a supply cartridge.
Figure 27:
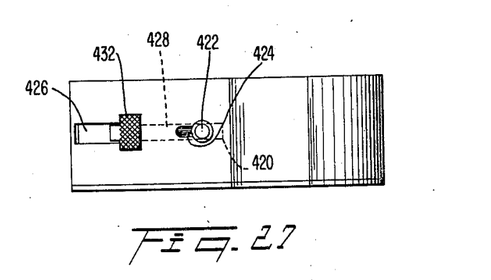
FIGURE 27 is an end elevational view of the cartridge illustrated in FIGURE 26.
Figure 28:
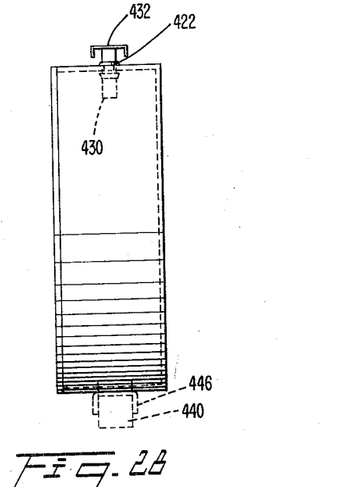
FIGURE 28 is a bottom view of the cartridge illustrated in FIGURE 26.

FIGURES 26 through 28 illustrate an alternate configuration for a preformed supply package or cartridge of carrier strip mounted electrical contact elements adapted for releasable securement o a crimping tool. In this embodiment, securement to a crimping tool is adapted to be effected by keyhole shaped apertures 410, 412 in the flat tool abutting wall 414 of the cartridge, it being understood that the engaged tool surface is provided with suitable studs to be received within said apertures.

Carrier strip delivery from the illustrated cartridge is effected by a slideably mounted feed member, generally designated 416, mounted in the cartridge wall adjacent to the delivery aperture 418 thereof. More specifically, the member 416 includes a base portion 420 secured to a rivet 422 displaceably mounted in a longitudinally disposed slot 424. Extending from the base portion 420 and disposed within the delivery channel 426 is a downwardly inclined spring arm 428 terminating in a dependent finger portion 430 adapted to be received intermediate the dependent sleeve portions 206 of the carrier strip link members. Extending upwardly from the pin portion 430 and disposed externally of the cartridge is a finger engaging operating surface 432.

In operation of the subject unit, carrier strip advance is effected by an initial downward depression of the surface 430 when the member is in retracted position so as to introduce the pin 430 intermediate a pair of dependent sleeves 206 of the cartridge contained carrier strip, followed by a longitudinal advance thereof in depressed condition in the direction indicated by the arrow on FIGFURE 26. A release of the surface 430 at the limit of advance by a repetition of the cycle further advance the carrier strip in increments determined by the length of longitudinal displacement of the feed member 416.

Selective positioning of the crimp depth control 180, in accordance with the dictates of the cartridges contained contact members is effected by means of a spring biased slide 440 displaceably mounted on the cartridge surface. As illustrated, the slide 440 is normally biased in an advanced position, as indicated by the arrow 442, by a biasing spring 444. Mounted at the end of the slide and displaceable in conjunction therewith is a block 446 positioned to engage the extension 185 of said link slide 180.

During cartridge securement to the tool, the slide 440 is manually retracted against the action of its biasing spring so as to remove the block 446 from interfering engagement with the extension 185 of the slide link 180. When the cartridge is properly secured to the tool, the slide 440 is released and advance by its biasing spring 444 a distance determined by the location of the stop surface 448, to concomitantly displace the link slide 180 an equal amount and to thereby selectively position the proper stud, i.e., 168, 170 or 172, in the path of advance of the piston rod 80. In the above construction, it is apparent that the selective location of the stop surface 448 will determine the limiting position of the block 446 and thereby determine the degree of displacement of the link slide 180.

Having thus described our invention we claim:

1. In a crimping tool, a dieholder having an axially disposed bore defining an operating location and a radially disposed workpiece transmission channel located on one of the facing surfaces threeof communicating with said bore, an operating member disposed in encircling relation with said dieholder and rotatively displaceable relative thereto, and reciprocatable means displaceable intermediate an advanced and a retracted position for advancing electrical connector elements through said transmission channel and into said operating location, said last mentioned means being displaceable to its retracted position by rotative displacement of said operating member relative to said dieholder.

2. In a crimping tool, a dieholder having an axially disposed bore defining an operating location and a radially disposed workpiece transmission channel communicating with said bore, an operating member disposed in encircling relation with said dieholder and rotatively displaceable relative thereto, a plurality of crimping dies radially mounted in said dieholder and displaceable relative to said operating location in selective accordance with the direction of rotative displacement of said operating member, reciprocatable means displaceable intermediate an advanced and a retracted position for advancing electrical connector elements through said transmission channel and into said operating location, said last mentioned means being displaceable to its retracted position by crimping die advancing rotative displacement of said operating member relative to said dieholder.

3. The construction as set forth in claim 2 including means normally biasing said reciprocatable means in its advanced position.

4. In a crimping tool, a disc shaped dieholder having an axially disposed bore defining an operating location and a diametrically disposed channel communicating with said bore, an operating member disposed in encircling relation with said dieholder and rotatively displaceable relative thereto, a plurality of crimping dies radially mounted in said dieholder and displaceable relative to said operating location in selective accordance with the direction of rotative displacement of said operating member, reciprocatable means displaceable intermediate an advanced and a retracted position for advancing electrical connector elements through said channel and into said operating location, means for biasing said reciprocatable means in advanced position, means for displacing said reciprocatable means to its retracted position in response to crimping die advancing rotative displacement of said operating member relative to said dieholder.

5. In a crimping tool, a disc shaped dieholder having a pair of facing surfaces, an axially disposed bore defining an operating location, a plurality of equiangularly spaced radial bores coplanarly disposed intermediate said facing surfaces and sized to individually contain crimping die members displaceable into said operating location and a diametric channel disposed in one of said facing surfaces of a depth at least coplanar with said crimping die bores to permit unilineal introduction of an electrical connector element into said operating location in the path of advance of said crimping dies; a lineally displaceable piston rod member disposed in substantial alignment with said dieholder, an operating member disposed in encircling engagement with said dieholder and rotatably displaceable relative thereto in response to lineal displacement of said piston rod member for effecting selective advance and retraction of said crimping dies relative to said operating location, reciprocatable means displaceable intermediate an advanced and a retracted position for advancing electrical connector elements through said transmission channel and into said operating location, means for normally biasing said reciprocatable means in advanced position, means for displacing said reciprocatable means to its retracted position in response to crimping die advancing rotative displacement of said operating member relative to said dieholder.

6. In a crimping tool capable of accommodating a series of consecutive electrical connector elements, a dieholder having an axially disposed bore defining an operating location and a radially disposed workpiece transmission channel communicating with said bore for conducting said series of elements into the bore, an operating member disposed in encircling relation with said dieholder and rotatively displaceable relative thereto, and reciprocatable means displaceable intermediate a first position and a second position for advancing said series of electrical connector elements through said transmission channel and into said operating location, said last mentioned means being displaceable to the first position by rotative displacement of said operating member relative to said dieholder.

7. In a crimping tool capable of accommodating a variety of sizes of electrical connector elements, each size being presented to the tool in a series of consecutive electrical connector elements of predetermined diameter, a dieholder having an axially disposed bore defining an operating location and a radially disposed workpiece transmission channel communicating with said bore for conducting said series of elements into the bore, an operating member disposed in encircling relation with said dieholder and rotatively displaceable relative thereto, a plurality of crimping dies radially mounted in said dieholder and displaceable relative to said operating location in selective accordance with the amount of rotative displacement of said operating member and means for selectively regulating the amount of rotative displacement of said operating member for accommodating each said size.

8. In a crimping tool capable of accommodating a variety of sizes of electrical connector elements, each size being presented to the tool in a series of consecutive electrical connector elements of predetermined diameter, the crimping tool having a lineally advanceable and retractable piston rod, means for advancing and retracting said piston rod, a crimping mechanism including crimping dies, means for advancing said dies in amounts responsive to the degree of lineal displacement of said piston rods, an electrical connector element supply for supplying one said series to the crimping mechanism and an external member releasably securable to said tool, regulating means for selectively regulating the depth of crimp, said regulating means comprising:

(A) control means for controlling the limit of advancement of said piston rod to establish the depth of crimp for each said size and for effecting retraction of said piston rod subsequent to establishing said depth of crimp; and (B) means responsive to the securement of the external member to said tool for selectively positioning said control means to allow said control means to operate in response to said advancement for establishing the requisite depth of crimp for the diameter of the elements in the supply.

9. In a crimping tool capable of accommodating a variety of sizes of electrical connector elements, each size being presented to the tool in a series of consecutive electrical connector elements of predetermined diameter, the crimping tool having a lineally advanceable and retractable piston rod, means for advancing and retracting said rod, a crimping mechanism including crimping dies and means for advancing said dies in amounts responsive to the degree of lineal displacement of said piston rod, and an electrical connector element supply cartridge releasably securable to said tool for supplying one said series to the crimping mechanism, regulating means for selectively regulating the depth of crimp, said regulating means comprising:
- (A) control means for controlling the limit of advancement of said piston rod to establish the depth of crimp for each said size and for effecting retraction of said piston rod subsequent to establishing said depth of crimp;
- (B) means displaceable by the securement of said cartridge to the tool for selectively positioning said control means in the path of advancement of said piston rod to allow said control means to be actuated by said advancement to establish the requisite depth of crimp for the diameter of the element in the cartridge and to retract the piston rod; and
- (C) full cycling means for precluding retraction of said piston rod prior to the establishment of said requisite depth of crimp and for precluding advancement of said piston rod prior to full retraction.

10. In a crimping tool capable of accommodating a variety of sizes of electrical connector elements, each size being presented to the tool in a series of consecutive electrical connector elements of predetermined diameter, the crimping tool having a dieholder including an axially disposed bore defining an operating location and a workpiece transmission channel communicating with said bore for conducting said series of elements into the bore, crimping dies mounted in the dieholder for advancement and retraction toward and from the axis of the bore, operating means for advancing and retracting the dies toward and from said axis, and reciprocatable means displaceable intermediate an advanced and a retracted position for advancing said series of electrical connector elements through said transmission channel and into said operating location, a unitary carrier strip assembly for delivering said series through said channel to said operating location, said carrier strip assembly comprising:
- (A) a series of link members of fixed external dimensions for receiving and carrying said electrical connector elements of any predetermined diameter;
- (B) integral web-like spacing members interconnecting said link members in uniform spaced relationship;
- (C) first means in each link member for axially positioning each element in said operating location; and
- (D) second means in each link member for being cooperatively engaged by said reciprocatable means for advancing said link members into said operating location in step-by-step synchronization with the operation of said operating means.

11. In a crimping tool capable of accommodating a variety of sizes of electrical conductor elements, each size being presented to the tool in a series of consecutive electrical connector elements of predetermined diameter, the crimping tool having a dieholder including an axially disposed bore defining an operating location and a radially disposed workpiece transmission channel communicating with said bore for conducting said series of elements into the bore, crimping dies mounted in said dieholder for advancement and retraction toward and from the axis of the bore, operating means for advancing and retracting the dies toward and from said axis and reciprocatable means displaceable intermediate an advanced and a retracted position for advancing electrical connector elements through said transmission channel and into said operating location, a unitary carrier strip assembly for delivering said series through said channel to said operating location, said carrier strip assembly comprising:
- (A) a series of link members of fixed external dimensions for receiving and carrying said electrical connector elements of any predetermined diameter;
- (B) integral web-like spacing members interconnecting said link members in uniform spaced relationship;
- (C) first means in each link member for axially positioning each element in said operating location;
- (D) second means in each link member for being cooperatively engaged by said reciprocatable means for advancing said link members into said operating location in step-by-step synchronization with the operation of said operating means; and
- (E) third means for precluding retrograde movement of said carrier strip assembly during retraction of said reciprocatable means.

References Cited in the file of this patent
UNITED STATES PATENTS

| | | |
|---|---|---|
| 758,195 | Schweinert et al. | Apr. 26, 1904 |
| 1,563,941 | Wichmann | Dec. 1, 1925 |
| 1,761,521 | Eastman | June 3, 1930 |
| 2,467,020 | Fischer | Apr. 12, 1949 |
| 2,715,764 | Pierce | Aug. 23, 1955 |
| 2,821,011 | Sanders et al. | Jan. 28, 1958 |
| 2,827,940 | Davis et al. | Mar. 25, 1958 |
| 2,897,870 | Berg | Aug. 4, 1959 |
| 2,939,505 | Bucher et al. | June 7, 1960 |
| 3,037,545 | Klingler et al. | June 5, 1962 |